June 6, 1967 A. L. M. FETTWEIS 3,324,247

RESONANT TRANSFER COMMUNICATION SYSTEM

Filed Oct. 6, 1964

Inventor
A. L. M. FETTWEIS

By [signature]
Attorney 3,324,247
RESONANT TRANSFER COMMUNICATION SYSTEM

Alfred Leo Maria Fettweis, Mol, Belgium, assignor to International Standard Electric Corporation, New York, N.Y., a corporation of Delaware Filed Oct. 6, 1964, Ser. No. 401,919
Claims priority, application Netherlands, Oct. 18, 1963, 299,480
4 Claims. (Cl. 179—15)

ABSTRACT OF THE DISCLOSURE

A resonant transfer network including resistive elements and storage reactances. The storage reactances are interconnected by a four terminal T-network wherein each series branch of the T-network is symmetrical and is made up of an inductance in series with a resistance with the series combination shunted by a second resistance. The shunt branch comprises a capacitor shunted by a resistance and includes the capacitance and resistance of a coupling used in interconnecting the various storage and highway components.

The invention relates to resonant transfer networks including a pair of reactive energy storage devices such as a pair of capacitances which may effectively be interconnected by a 4-terminal network including at least two resistances as well as reactances. The networks are designed so that with a given energy in any one of said storage devices and none in the other at the beginning of an effective interconnecting time, after said time, the energy is transferred and stored in said other device while there is substantially none in said one device.

Such resonant transfer networks are known for example from the United States Patent No. 3,117,185. In particular they are useful to provide a common multiplex bidirectional amplifier for the samples transmitted by the resonant transfer principle using time division multiplex arrangements. In the simplest resonant transfer circuit, there are only two capacitances which are serially interconnected through one or more series inductances and gates and if the period of effective interconnection is precisely equal to half the natural period of oscillation of such a series resonant circuit, with the two capacitances of equal value, it will be found that the voltages initially present across them at the beginning of the effective interconnection time will be exactly interchanged at the end thereof. Such a capacitance may in practice be constituted by the high frequency output impedance of a low-pass filter measured on the side of the gate or gates serving to interconnect the network at a frequency at least equal to twice the highest frequency to be transmitted by said low-pass filter. The other side of the low-pass filter may usually be connected to a resistive termination. Then with such an arrangement at both ends, an exchange of signals may take place in accordance with the time division principle and on a multiplex basis, using the resonant transfer principle for the interchange of the charges on the effective capacitances.

In practice, the inductive serving to establish the resonant transfer circuit as well as the gate or gates will exhibit some losses and the resonant transfer circuit will therefore not be purely reactive. As explained in the above mentioned patent, this will mean some transmission losses and also reflections which are usually undesirable. The circuits disclosed in the above mentioned patent enable the avoidance of such reflections and not only compensate for the losses but also enable a gain of energy. Moreover this gain may be bidirectional. As disclosed in the patent such a biddirectional repeater operating in accordance with the resonant transfer principle may be obtained by placing a 4-terminal network between the two gates giving access to the respective capacitances. This 4-terminal network may be a T-network the two series branches of which are made up of an inductance in series with a resistance and the central shunt branch may also be made up of an inductance in series with a resistance. It is shown in the patent that with a common ratio between the inductance and the resistance of each of the three branches of such a 4-terminal network, a resonant transfer without reflection can be secured so that assuming for instance that there was zero energy in one capacitance and some energy in the other at the beginning of an interconnection time, at the end thereof there will now be zero energy or substantially none in the initially charged capacitance. Yet, it will be possible under such conditions to obtain at the end of the effective interconnecting time a different amount of energy in the other capacitance than was initially stored in the first. With the above circuit this can be secured, for instance, provided the two series resistances are negative while it is the shunt inductance which is negative, the remaining three elements being positive. Such a network thus includes three inductances in a T configuration with one of them negative; which cofiguration may be realized by a transformer.

Various embodiments are disclosed in the above mentioned patent, but in all of them only resistances and inductances are used for the 4-terminal network when it is assumed that the two energy storage devices to be interconnected are constituted by capacitances. Yet in practice, as disclosed in the U.S. Patent No. 3,073,903, the resonant transfer network usually includes a certain amount of cabling to interconnect the two capacitances through the gates, and the series inductances and cabling unavoidably introduce spurious elements the most significant of which is an equivalent shunt capacitance to ground. As disclosed in this second patent however, it has been found possible in a resonant transfer circuit comprising two capacitances effectively interconnected through gates and a network comprising two series inductances with a shunt capacitance, to realize a perfect interchange of energy between the two end capacitances in this ideally reactive circuit, provided the value of the central shunt capacitance is suitably chosen with respect to the value of the end capacitances. For instance, with the two end capacitances of equal value, a preferred value for the central shunt capacitance is equal to ⅔ of the end capacitance values. Since such a shunt capacitance will generally be found in practical circuits, it would be of interest to be able to design interconnecting 4-terminal networks which can take losses into account and yet avoid reflections, while being adapted to reckon with such a shunt capacitance.

Accordingly a first characteristic of the invention is that in resonant transfer networks of the type initially defined, said reactances include at least one reactance of the same type as the reactances constituting said storage devices.

The U.S. Patent No. 3,073,903 shows that it is possible when considering a purely reactive interconnecting network to have a perfect exchange of energy in accordance with the resonant transfer principle even with a mid-shunt capacitance to ground, and that furthermore with that mid-shunt capacitance initially discharged at the beginning of an effective interconnecting time, this mid-shunt capacitance is again discharged at the end of the interconnecting interval it is desirable to achieve this result even when the interconnecting 4-terminal network is not purely reactive. Indeed, when using such resonant transfer networks in time division multiplex systems the central shunt capacitance is the highway shunt capacitance which is thus common for a number of simultaneous connections established in accordance with the time division principle any energy which is left on that highway capacitance or any additional padding capacitance, after the end of a short interconnecting time assigned to one connection, will result in crosstalk since it will still be there when a new effective interconnection is established through the same highway between another pair of end capacitances. In practice, this may be solved by reserving a guard time between each interconnecting time or channel time slot and the next so that during this guard time the common highway capacitance may be discharged. Even if in theory this highway capacitance should be perfectly discharged at the end of every interconnecting time, in practice imperfections in the knowledge of the circuit elements or in the timing will result in some residual energy being left. This can be removed by clamping, i.e. by interconnecting across this capacitance a resistance of suitable value through a gate which is made conductive only during the guard times separating the channel time slots. Nevertheless even if a clamping arrangement such as described above is used, its requirements will be considerably eased if in theory at least the circuit is such as to perfectly discharge the highway capacitance at the end of every interconnecting time.

Accordingly, a further characteristic of the invention is that said 4-terminal network includes at least one resistance associated with said one reactance and said network being so designed that with no energy in said one reactance at the beginning of said effective interconnection of predetermined duration, at the end thereof there is again substantially no energy left in said one reactance.

In practice, the end storage devices will be constituted by capacitances accordingly, said one reactance of the same type included in the 4-terminal network will be a capacitance such as the highway capacitance mentioned above, having a capacitance up to two thirds of the value of each of the end capacitances. With such a circuit the resistance is connected in shunt across this equivalent highway capacitance and in this manner it is possible to keep the voltage across this highway capacitance unchanged at the end of the effective interconnecting time even though the sum of the energies stored across the two end capacitances is not the same at the end of the effective interconnecting time as it was at the beginning, by virtue of either a gain or a loss.

The above and other objects and characteristics of the invention as well as the invention itself will be better understood from the following description of detailed embodiments thereof to be read in conjunction with the accompanying drawings in which.

Figure 1:
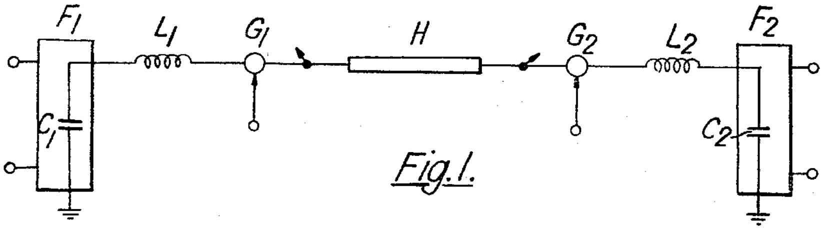
FIG. 1 illustrates a lossless resonant transfer network operated in time division multiplex fashion.

Referring to FIG. 1, the latter shows in simplified form, the so called pulse modem circuit or resonant transfer circuit which is particularly useful in time division multiplex systems. It is shown to include two storage capacitances $C_1$ and $C_2$ each of which have one of their terminals connected to ground and are interconnected at their other terminals through a series circuit comprising the inductance $L_1$, the gate $G_1$, the multiplex highway H, the gate $G_2$ and the inductance $L_2$. As indicated, the shunt capacitances $C_1$ and $C_2$ can be constituted by the impedances of the filters $F_1$ and $F_2$ as seen on the pulse side, i.e. on the side of the highway H, at very high freqeuncy. As indicated by the multipling arrows next to the highway H, the latter may be used in common for a plurality of simultaneous transmissions using the time division multiplex principle. For each time division communication the two gates $G_1$ and $G_2$ are simultaneously unblocked. The pin blocking occurs repeatedly, for instance at a 10 kc./sec. rate, responsive to pulses applied to the gates as indicated by arrows $P_1$, $P_2$. It is possible to transmit voice frequency signals which may be applied to the filters $F_1$ and $F_2$ on the other sides than those facing the gates. When the time $t_1$ during which the two gates $G_1$ and $G_2$ are simultaneously unblocked is an odd multiple of half the period of the series resonant circuit constituted by the capacitors $C_1$ and $C_2$ and the inductances $L_1$ and $L_2$, then after an interconnection of such a duration, the charges which stood initially across the capacitors $C_1$ and $C_2$ will have been interchanged. In this manner, despite the sampling process, unattenuated communications may in principle be achieved. The filters $F_1$ and $F_2$ may for instance be low-pass filters, for converting the pulses into voice frequency energy.

Such a circuit is however lossless only as long as there are no resistive elements which are part of the overall transmission circuit and as long as no reflections are incurred. In practice however some losses will normally be suffered and the series resonant transfer circuit shown in FIG. 1 will in fact include resistive elements such as those corresponding to the losses in the coils and those corresponding to the fact that the gates $G_1$ and $G_2$, when conductive, have a resistance, which is not entirely negligible. As explained in the first patent mentioned above, it is possible to compensate such resistive losses and even to secure a gain without reflections. Such losses in the resonant transfer circuit are not only undesirable in themselves, but they also lead to reflections which should preferably be avoided.

The circuits discussed in the first patent mentioned above, were all of the type which included only resistive or inductive elements apart from the two capacitances $C_1$ and $C_2$ serving as reactive energy storage elements. In practice however, as discussed in the second patent mentioned above, there are also parasitic capacitive elements primarily due to the highway parasitic capacitance to ground. Instead, this highway H, or several in cascade, will sometimes be constituted by a length of coaxial cable which can be long enough to introduce an appreciable equivalent capacitance. For purely reactive resonant transfer circuits, it has been shown that by suitably dimensioning this mid-shunt capacitance with respect to the energy storage capacitances, it was possible to achieve perfect interchange of the charges on these capacitances.

Figure 2:
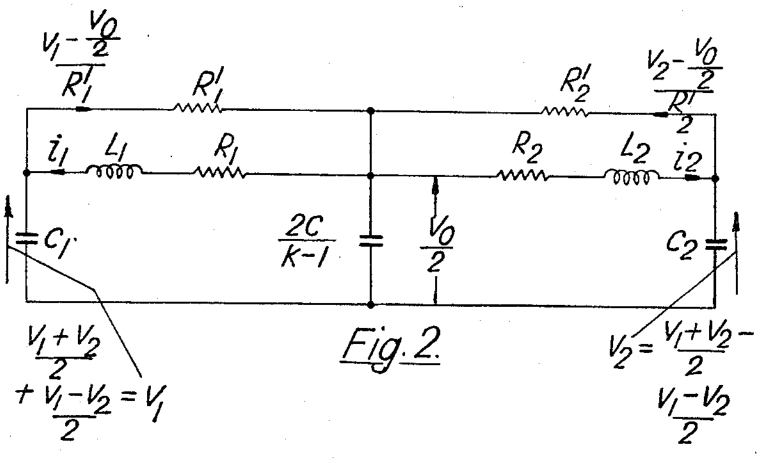
FIG. 2 illustrates a 4-terminal network in accordance with the invention for the interconnection of two capactitances following the resonant transfer principle.

FIG. 2 shows a resonant transfer circuit similar to that of FIG. 1 but wherein a mid-shunt capacitance $2C/k-1$ ($k$ being a dimensionless parameter larger than unity) has been included. Additionally, resistances $R_1$ and $R_2$ have been inserted in series with the inductances $L_1$ and $L_2$ respectively while resistances $R_1'$ and $R_2'$ shunt these respective series combinations. When both resistances such as $R_1$ and $R_1'$ are positive, they might for instance correspond to the resistive losses of the coil $L_1$ or in any event such resistive losses may be incorporated when choosing the values of the resistance $R_1$ and $R_1'$.

If the instantaneous voltages across the capacitors $C_1$ and $C_2$ are $v_1$ and $v_2$ respectively, it is possible to express these instantaneous voltages in function of the time $t$ as follows $$v_1-v_2=Ve^{n_0t}\frac{\cos(\omega_0t+a_0)}{\cos a_0} \quad (1)$$

$$v_1+v_2=V_1e^{n_1t}\cos(\omega_1t+a_1)+V-V_1\cos a_1 \quad (2)$$

The above equations assume that the network of FIG. 2 is symmetrical. The symmetry condition facilitates the analysis since it is then possible to apply Bartlett's bisection theorem or in other words to decompose the instantaneous voltage $v_1$ and $v_2$ into the sum and the difference respectively of two other voltages which are equal to $v_1+v_2/2$ and $v_1-v_2/2$ respectively. Then the network may be analysed by decomposing the effects of the voltage $v_1-v_2/2$ and $v_1+v_2/2$. Considering the case of the voltages $v_1-v_2/2$ which appear across the capacitors $C_1$ and $C_2$ in series aiding, due to the symmetry, there is no current returning to the junction of the two capacitors $C_1$ and $C_2$ through other elements of the network, i.e. the capacitor $2C/k-1$, and accordingly such an element as $2C/k-1$ plays no part in determining the voltage $v_1-v_2$ which is determined by the dipole comprising such elements as $C_1$, $L_1$, $R_1$ and $R_1'$. On the other hand, to find the value of $v_1+v_2$, one notes that the unconnected ends of the capacitors $C_1$ and $C_2$ are now at the same potential so that these equipotential ends may be interconnected to determine the $v_1+v_2$. Thus, this will again be determined by the roots of a dipole which is analogous to that first mentioned (left-hand part of the network) except that the capacitor thereof is now composed of the capacitor $C_1$ in series with $C/k-1$ (half the mid-shunt capacitor). If $C_1=C$ the value of this composite capacitor will thus be $C/k$.

Accordingly, by finding the complex conjugate roots of such dipoles, it can be shown that the angular frequencies $\omega_0$ and $\omega_1$ as well as the real parts $n_0$ and $n_1$ of such complex conjugate roots, and which parameters appear in (1) and (2) are given by $$\omega_0^2=\frac{1-d_0^2}{LC} \tag{3}$$

$$\omega_1^2=\frac{k(1-d_1^2)}{LC} \tag{4}$$

$$-2n_0=\frac{1}{CR'}+\frac{R}{L} \tag{5}$$

$$-2n_1=\frac{k}{CR'}+\frac{R}{L} \tag{6}$$

where the auxiliary dimensionless parameters $d_0$ and $d_1$, whose moduli are each smaller than unity to ensure oscillatory conditions, are defined by $$d_0^2=\frac{LC}{4}\left(\frac{1}{CR'}-\frac{R}{L}\right)^2<1 \tag{7}$$

$$d_1^2=\frac{LC}{4k}\left(\frac{k}{CR'}-\frac{R}{L}\right)^2<1 \tag{8}$$

with $$C_1=C_2=C \tag{9}$$
$$L_1=L_2=L \tag{10}$$
$$R_1=R_2=R \tag{11}$$
$$R_1'=R_2'=R'\neq-R \tag{12}$$

in view of a symmetrical circuit being considered and since it is necessary that R and R' should not be qual and opposite if oscillatory conditions are to be obtained.

The remaining parameters appearing in (1) and (2) are V, $V_1$, $a_0$ and $a_1$ and by considering these two equations it is seen that V represents the voltage initially present across the lefthand capacitor $C_1$ at time $t=0$, it being assumed that the other two capacitors $2C/k-1$ and $C_2$ are at that moment discharged. At $t=0$, when the circuit of FIG. 2 is initially established, there are also no currents circulating through the inductances $L_1$ and $L_2$ and these two initial conditions will determine two of the remaining parameters appearing in (1) and (2). The last parameter of these will be determined by the steady state condition of the network.

First considering the latter, in the steady state condition of the network of FIG. 2, the voltages across the three capacitors $C_1$, $2C/k-1$ and $C_2$ must necessarily all be equal to one another. But since these three capacitors are interconnected at one of their plates, with no other element connected thereat, the sum of the currents flowing through these must be 0. Or in other words, due to the conservation of the electrostatic charge, one may write the following equation linking the three voltages $v_1$, $v_0/2$ and $v_2$, $v_0/2$ being the voltage across capacitor $2C/k-1$:

$$C(v_1+v_2)+\frac{Cv_0}{k-1}=CV \tag{13}$$

CV being the total charge of these three capacitors and initially located on $C_1$. Under steady state conditions, by examining (1) and (2) it is seen that this common voltage value for the three capacitors will thus be equal to $$\frac{V-V_1\cos a_1}{2}$$

and by replacing $v_1$, $v_2$ and $v_0/2$ by this common value in (13) one finds $$kV_1\cos a_1=V \tag{14}$$

Accordingly, using this last result, (2) may now be written as $$v_1+v_2=\frac{Ve^{n_1t}}{k}\,\frac{\cos(\omega_1t+a_1)}{\cos a_1}+V(1-1/k) \tag{15}$$

By differentiating (1) and (2), the currents through $L_1$ and $L_2$ may be obtained and more precisely $i_1-i_2$ and $i_1+i_2$. The difference between the currents $i_1$ and $i_2$ can be written as $$i_1-i_2=C\frac{d(v_1-v_2)}{dt}+\frac{v_1-v_2}{R'}$$
$$=\frac{Ve^{n_0t}}{R'\cos a_0}(n_0CR'+1)\cos(\omega_0t+a_0)-\omega_0CR'\sin(\omega_0t+a_0) \tag{16}$$

Likewise, the equation for $i_1+i_2$ can be written as $$i_1+i_2=C\frac{d(v_1+v_2)}{dt}+\frac{v_1+v_2-v_0}{R'}$$
$$=\frac{Ve^{n_1t}}{kR'\cos a_1}(n_1CR'+k)\cos(\omega_1t+a_1)-\omega_1CR'\sin(\omega_1t+a_1) \tag{17}$$

wherein $v_0$ is eliminated from the second expression by using (13).

Considering the relations (16) and (17) identifying the two currents through the inductance $L_1$ and $L_2$ the constants $a_0$ and $a_1$ can be determined from the initial conditions which impose no current through these inductances at time $t=0$. Moreover, particularly when using the resonant transfer principle in time division multiplex fashion it is desirable that the currents $i_1$ and $i_2$ in the two inductances should also be equal to 0 at the end of the resonant transfer, i.e. at time $t_1$. Otherwise, such residual currents might cause difficulties in the operation of the gates such as $G_1$ generally constituted by transistors or if one attempts to eliminate them it is then necessary to provide a shun path across such inductances as $L_1$ and $L_2$ which would have to be gate controlled and operated after the time $t_1$ to remove these currents in readiness for the next resonant transfer which would generally involve another communication if used on a time division multiplex basis. Thus from (16) and (17) one may write $$\tan a_0=\tan(\omega_0t_1+a_0)=\frac{n_0}{\omega_0}+\frac{1}{\omega_0CR'} \tag{18}$$

$$\tan a_1=\tan(\omega_1t_1+a_1)=\frac{n_1}{\omega_1}+\frac{k}{\omega_1CR'} \tag{19}$$

which imply that both $\omega_0t_1$ and $\omega_1t_1$ should be multiples of $\pi$ if both $i_1$ and $i_2$ are to be zero at $t=t_1$. Using (1) and (15) wherein $a_0$ and $a_1$ are now determined from (18) and (19), the condition for a reflectionless resonant transfer which imposes $v_1=o$ at $t=t_1$ since the initial voltage across $C_2$ was assumed to be 0, and the equation giving the gain may be written as $$0=G\frac{\cos(\omega_0t_1+a_0)}{\cos a_0}+\frac{e^{n_1t_1}}{k}\,\frac{\cos(\omega_1t_1+a_1)}{\cos a_1}+1-\frac{1}{k} \tag{20}$$

$$v_2 = -GV\frac{\cos(\omega_0 t_1 + a_0)}{\cos a_0} \quad (21)$$

where G is a gain factor given by $$G = e^{n_0 t_1} \quad (22)$$

Since it is desirable that both $\omega_0 t_1$ and $\omega_1 t_1$ should be multiples of $\pi$ and since $k$ is positive and larger than unity, at least $\omega_0 t_1$ or $\omega_1 t_1$ must be an odd multiple of $\pi$ if (20) is to be satisfied. In general, as for the normal lossless resonant transfer, it would be desirable to have $\omega_0 t_1$ as an odd multiple of $\pi$ and $\omega_1 t_1$ as an even multiple of $\pi$ thus securing a transmission without phase shift as indicated by (21). In this case, and using the lowest possible frequencies, to limit the variations due to mistiming, one may write $$\omega_0 t_1 = \pi \quad (23)$$

$$\omega_1 t_1 = 2\pi \quad (24)$$

defining the two angular frequencies. When $\omega_0 t_1$ and $\omega_1 t_1$ are odd and even multiples of $\pi$ respectively, e.g. when (23) and (24) are satisfied, (20) now becomes $$e^{n_1 t_1} = kG - k + 1 \quad (25)$$

which imposes the condition $$G > 1 - 1/k \quad (26)$$

thus showing that the gain factor G cannot go below a given value which depends upon $k$ and which value is smaller than unity, so that in any event this still permits any kind of amplification to be secured with a reflectionless resonant transfer providing for zero currents in the two inductances at the end of the transfer, while a certain range of attenuation is also permitted under these conditions.

Dividing (25) by (22) and using the difference between (5) and (6) the following relation may be written down $$e^{-\frac{(k-1)t_1}{2CR'}} = e^{(n_1 - n_0 t_1)} = k - \frac{k-1}{G} \quad (27)$$

which clearly shows, assuming that all reactive elements must be positive, that R′ will either be positive or negative respectively depending on whether an attenuation ($G<1$) or a gain ($G>1$) is desired.

Using the same relations, it is also possible to write a relation which will this time permit to examine the sign of R in function of the value of G, i.e.

$$e^{-\frac{(K-1)Rt_1}{2L}} = e^{(kn_0 - n_1)t_1} = \frac{G^k}{kG - k + 1} > 1 \quad (28)$$

the minimum value of +1 being obtained by considering the derivative of this function of G which is equal to $$\frac{k(k-1)(G-1)G^{k-1}}{(kG-k+1)^2} \quad (29)$$

and indicates that the minimum value is secured for G equal to unity. Accordingly, since this function of G can never become smaller than unity it is clear that R must always be negative irrespective of whether G is larger or smaller than unity. Thus, if a gain is desired with the circuit of FIG. 2 and with $\omega_0 t_1$ and $\omega_1 t_1$ being odd and even multiples of $\pi$ respectively, the two pairs of resistances R and R′ will have to be negative. The resistance R′ can only be positive if an attenuation is desired, respecting the condition (26).

Once C is determined by the desired impedance level of the network and G is determined by the desired gain or attenuation, the remaining network elements or parameters L, R, R′, $k$, $n_1$ and $n_0$ can be determined from the preceding equations $n_0$ being in fact immediately obtained from (22).

However since the unknown $n_1$ and the parameter $k$ are linked by such an equation as (25) which is transcendental, the following remarks may be made to help the determination of the unknown parameters.

Considering (3) and (4), in general, and especially when a relatively low gain or attenuation is desired, (7) and (8) giving $d_0^2$ and $d_1^2$ will be relatively small as compared to unity. This will especially be true if R and R′ are of the same sign. Such low values for $d_0$ and $d_1$ are obviously desirable if the resistive elements should have little effect on the natural frequencies of the network. Thus, as a first approximation it is possible to ignore $d_0^2$ and $d_1^2$ as compared to unity and in such a case, (3) and (4) indicate that $k$ is directly given in function of the ratio between the angular frequencies $\omega_0$ and $\omega_1$, i.e.

$$k = \frac{\omega_1^2}{\omega_0^2} \quad (30)$$

this as a first approximation. Once $k$ is known, e.g. $k=4$, (25) permits to determine $n_1$ and since $n_1$ and $n_0$ are now known by taking the difference between (6) and (5) the resistance R′ can be found. The ratio between R and L is also determined from these last two equations, but the values of R and L have still to be identified. Provided $d_0$ is sufficiently small however, Equation 3 permits to determine LC and L being known, so is R. All the elements have now been found but one must now determine $d_0$ and $d_1$ to verify that the value of two dimensionless parameters are indeed sufficiently small so that their squares can be neglected with respect to unity. Using (7) and (8) and the values of the elements L, R, R′ calculated in the manner just described, one obtains $$|d_0| = \frac{n_0(k+1) - 2n_1}{\omega_0(k-1)} \quad (31)$$

$$|d_1| = \frac{2n_0 k - n_1(k+1)}{\omega_0(k-1)\sqrt{k}} \quad (32)$$

If the values of $d_0$ and $d_1$ thus obtained are insufficiently small, then they may be inserted in Equations 3 and 4 and by taking the ratio between these two a new value for the parameter $k$ may be secured from which a new set of values can be derived.

Taking a particular gain corresponding to $G=3$ or 9.54 decibels for example, using $\omega_1 = 2\omega_0$, $k$ is thus equal to 4 as a first approximation and computing the various element and parameter values in the manner indicated above and particularly $d_0$ and $d_1$ by means of (31) and (32) it is found that $$d_0 = d_1 = \frac{\log_e 3}{3\pi} \quad (33)$$

showing that $d_0$ is actually equal to $d_1$ for the particular case of $G=3$. In this case, $n_1 = 2n_0$ and the value of $k=4$ is in fact the exact value for $k$. For this particular case of $G=3$, apart from $k$, the remaining exact element values are determined from $$CR' = -\frac{3t_1}{2\log_e 3} \quad (34)$$

$$CR = -\frac{4t_1 \log_e 3}{3\pi^2(1+d_0^2)} \quad (35)$$

$$LC = \frac{t_1^2}{\pi^2(1+d_0^2)} \quad (36)$$

and it is observed that the two pairs of resistances R and R′ are negative. But it is also possible to secure some attenuation if the resistances R′ are positive. However, the resistances R remain negative and as indicated by (26), the amount of attenuation is limited. For a value of $k=4$, this maximum attenuation is thus 2.5 decibels. When both $\omega_0 t_1$ and $\omega_1 t_1$ are odd multiples of $\pi$, the relation (25) still holds but with a reversal of sign, and this is also true for (27), (28) and (29), while the condition (26) is reversed. This means that G must now be smaller than $$1 - \frac{1}{k}$$

The lowest frequencies at which such a condition can be secured are determined by (23) in combination with $$\omega_1 t_1 = 3\pi \quad (37)$$

Thus, using the third harmonic instead of the second, it is now possible to secure any amount of attenuation. The following table indicates a few values of some of the parameters in function of the gain factor G:

| | | | |
|---|---|---|---|
| $G=e^{n_0 t_1}$ | $\frac{k-2}{k}$ | $\frac{k-1}{k+1}$ | $\frac{k-1}{k}\frac{\left(\frac{k-1}{k}\right)^{k}+1}{\left(\frac{k-1}{k}\right)^{k-1}+1}$ |
| $n_0 t_1$ | — | — | — |
| $k-1-kG=e^{n_1 t_1}$ | 1 | $\frac{k-1}{k+1}$ | $\frac{1}{\frac{k}{k-1}+\left(\frac{k}{k-1}\right)^{k}}$ |
| $n_1 t_1$ | 0 | — | — |
| $\frac{k-1-kG}{G}=e^{-\frac{(k-1)t_1}{2CR'}}$ | $\frac{k}{k-2}$ | 1 | $\frac{1}{\frac{k}{k-1}+\left(\frac{k}{k-1}\right)^{k-1}}$ |
| $R'$ | — | $\infty$ | + |
| $\frac{G^k}{k-1-kG}=e^{-\frac{(k-1)Rt_1}{2L}}$ | $\left(\frac{k-2}{k}\right)^{k}$ | $\left(\frac{k-1}{k+1}\right)^{k-1}$ | 1 |
| $R$ | + | + | 0 |

All three values of G which are given above are evidently smaller than unity, corresponding to attenuations and accordingly, for all three, $n_0$ is negative as indicated. For the first value of $$G=\frac{k-2}{k}$$

or 2.2 decibels when $k$ is equal to 9 as indicated by (23) and (37) in conjunction with (3) and (4), $n_1$ is equal to 0 and R′ is negative while R is positive. These signs for the resistances are also true for larger attenuations.

For a slightly smaller attenuation corresponding to $$G=\frac{k-1}{k+1}$$

or 1.94 decibels, R′ becomes infinite while R remains positive. Hence for this particular attenuation value it is possible in principle to reduce the circuit of FIG. 2 to one where the pair of resistances $R_1'$ and $R_2'$ have disappeared.

For yet a somewhat smaller attenuation value corresponding to 1.3 decibels for $k=9$, as indicated in the third column of the above table, it is now possible to make the negative of the function of G identified by (28) equal to unity and in this case $R=0$ while R′ is positive. Thus, for this particular value it is in principle possible to reduce the circuit of FIG. 2 to one where the pair of resistances $R_1$ and $R_2$ have been replaced by short circuits.

Accordingly, depending on the value of G, the values of the resistances R and R′ will either be both negative, of opposite signs or both positive. The latter case will occur for a short range of attenuation values the limits of which are indicated by the last two columns of the above table.

While it is clear by considering (20) that $\omega_0 t_1$ and $\omega_1 t_1$ cannot both be even multiples of $\pi$, since $k$ must be larger than unity, a phase reversal for $v_2$ may nevertheless be secured when $\omega_0 t_1$ is an even multiple of $\pi$ and $\omega_1 t_1$ is an odd multiple of $\pi$. In such a case, by considering expressions corresponding to (27) and (28), it can be seen that R′ will be negative while R will either be positive or negative depending on whether an attenuation or a gain is desired. Referring to (3) and (4), it is however seen that if both $d_0$ and $d_1$ are to remain small so that the natural frequencies of the circuit are not affected by variations in the resistive elements, it is no longer possible to use the fundamental frequency and the lowest values which can be selected for $\omega_0$ and $\omega_1$ must be such that $\omega_0 t_1=2\pi$ while $\omega_1 t_1=3\pi$, this in order to make $k$ larger than 1, i.e. 9/4.

Figure 3:
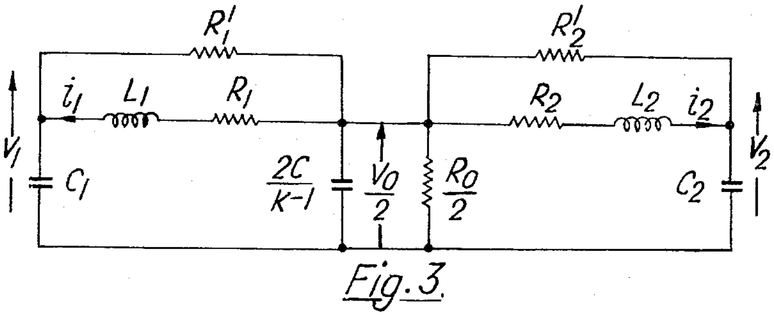
FIG. 3 illustrates a modification of the circuit of FIG. 2 to avoid residual energy in a capacitance part of the 4-terminal interconnecting network.

FIG. 3 shows a modification of FIG. 2 in which the mid-shunt capacitance is now shunted by a resistance $R_0/2$. It will be shown that with this arrangement it becomes possible to secure either a gain or an attenuation in either direction and while the currents in the two inductances $L_1$ and $L_2$ will again be zero at time $t_1$, at the end of the interconnection the voltage $v_0$ across the mid-shunt capacitance will now also be zero at the same time. In other words, the transfer network will be without energy at the end of the interconnection which means that in principle no clamping means are required to discharge the mid-shunt capacitance or that at any rate if these are still required to take care of residual charges due to imperfections in the circuit, the requirements on such clamping circuits will be considerably eased.

For the circuits of FIG. 3, Equation 1 is still valid but Equation 2 must now be replaced by $$v_1+v_2=V_1 e^{n_1 t}\cos(\omega_1 t+a_1)+(V-V_1\cos a_1)e^{n_2 t} \quad (38)$$

since the characteristic dipole for the determination of such a voltage as $v_1+v_2$ being now of the third degree, in addition to the two complex conjugate roots $n_1 \pm j\omega_1$, there is a single real root $n_2$. This is true provided the following inequality is satisfied $$\frac{R+R'}{L} \neq \frac{k-1}{CR_0} \quad (39)$$

in addition to (12).

Since (1) is still valid, this must also be true of (16) and accordingly of (18) whereby $\omega_0 t_1$ must again be a multiple of $\pi$ for the circuit of FIG. 3. The relation (13) is however no longer valid for the circuit of FIG. 3 in view of the inclusion of the resistance $R_0/2$. Accordingly, $i_1+i_2$ can no longer be directly expressed in terms of $v_1+v_2$ as in (17) and instead the following three relations may be written down to link the variables $v_1+v_2$, $v_0$ and $i_1+i_2$:

$$i_1+i_2=C\frac{d(v_1+v_2)}{dt}+\frac{v_1+v_2-v_0}{R'} \quad (40)$$

$$v_1+v_2-v_0+R(i_1+i_2)+L\frac{d(i_1+i_2)}{dt}=0 \quad (41)$$

$$\frac{v_0}{R_0}+\frac{C}{k-1}\frac{dv_0}{dt}+C\frac{d(v_1+v_2)}{dt}=0 \qquad (42)$$

this last replacing (13).

These clearly indicate that both $v_0$ and $i_1+i_2$ will be of the same type as $v_1+v_2$. Thus, $v_0$ and $i_1+i_2$ can be expressed as $$v_0=V_2e^{n_1t}\cos(\omega_1t+a_2)-V_2e^{n_2t}\cos a_2 \qquad (43)$$

$$i_1+i_2=I_1e^{n_1t}\cos(\omega_1t+b)-I_1e^{n_2t}\cos b \qquad (44)$$

wherein $V_2$, $a_2$, $I_1$ and $b$ are further constants to be determined by the boundary conditions. Just as (38) indicates that $v_1+v_2=V$ at time $t=0$ (43) and (44) show that $v_0$ as well as $i_1+i_2$ are both equal to zero at time $t=0$. At the end of the resonant transfer, i.e. at time $t_1$, by considering (43) and (44) it is observed that if $\omega_1t_1$ is an even multiple of $\pi$ while $n_2=n_1$, both $v_0$ and $i_1+i_2$ will again be simultaneously equal to zero. If these conditions are observed, and when (1) is added to (38) in order to express $v_1$ at time $t_1$, since (18) is applicable and indicates that $\omega_1t_1$ must be a multiple of $\pi$, it is found that $v_1$ will be equal to 0 at time $t_1$ provided $\omega_0t_1$ is an odd multiple of $\pi$ while at the same time $n_0$ is equal to $n_1$ and to $n_2$. Thus, for the circuit of FIG. 3 an essential condition is $$N_0=n_1=n_2=-n \qquad (45)$$

wherein $-n$ is the common value of all the real parts of the roots, while $\omega_0t_1$ and $\omega_1t_1$ are odd and even multiples of $\pi$ respectively. As for the lossless resonant transfer network, i.e. when R′ and $R_0$ are infinite while R is zero, preferred values for the angular frequencies will thus be those given by (23) and (24).

It can be shown that these conditions constitute a unique solution to the general problem of avoiding reflections while leaving the reactances of a symmetrical resonant transfer interconnecting network free of energy at the end of the transfer, assuming this was their initial condition.

Since the dipole in the circuit of FIG. 3 which characterizes $v_1-v_2$ is the same as for the circuit of FIG. 2, $n$ is thus given by $$2n=\frac{1}{CR'}+\frac{R}{L} \qquad (46)$$

which corresponds to (5) for $n_0$. Likewise, the angular frequency $\omega_0$ is the same for the circuit of FIG. 3 as for that of FIG. 2 and accordingly it can be expressed by $$n^2+\omega_0^2=\frac{R+R'}{LCR'} \qquad (47)$$

which is another way to define that angular frequency than by means of the parameter $d_0$ appearing in (3). In FIG. 3, the dipole characterizing the shape of $v_1+v_2$ is composed of the capacitor $C_1$ in series with the shunt combination of $R_1''$ with series circuit $R_1$, $L_1$ followed again in series by the combination of the capacitor $C/k-1$ in parallel with $R_0$. If the impedance of such a dipole is written down, by applying the conditions that the root $n_2$ must be equal to the real part $n_1$ of its complex conjugate roots which itself is defined as $n$, i.e. (46) and (46) three further relations can be written down:

$$3n=\frac{(k-1)(R_0+R')}{CR_0R'}+\frac{1}{CR'}+\frac{R}{L} \qquad (48)$$

$$3n^2+\omega_1^2=\frac{k-1}{CR_0}\left(\frac{1}{CR'}+\frac{R}{L}\right)+\frac{k(R+R')}{LCR'} \qquad (49)$$

$$n(n^2+\omega_1^2)=\frac{(k-1)(R+R')}{LC^2R'R_0} \qquad (50)$$

The last five equations are thus sufficient to solve the network. The element values L, R, R′, $R_0$ and the parameter $k$ can be expressed in terms of $\omega_1$, $\omega_0$, C defining the impedance level and $n$ defined by the gain G, i.e. (22), by solving this set of five equations, i.e.

$$LC=\frac{1}{\omega_0^2}\left(\frac{\omega_0^2-n^2}{\omega_0^2+n^2}\right)^2 \qquad (51)$$

$$k-1=\frac{(\omega_0^2-n^2)(\omega_1^2-\omega_0^2)}{(\omega_0^2+n^2)^2} \qquad (52)$$

$$nCR=\frac{n^2(\omega_0^2-n^2)(3\omega_0^2-n^2)}{\omega_0^2(\omega_0^2+n^2)^2} \qquad (53)$$

$$nCR'=\frac{n^2-\omega_0^2}{n^2+\omega_0^2} \qquad (54)$$

$$nCR_0=\frac{(\omega_0^2-n^2)(\omega_1^2-\omega_0^2)}{(\omega_0^2+n^2)(\omega_1^2+n^2)} \qquad (55)$$

wherein a factor $n$ has been retained on both sides of (53) to secure homogeneous expressions for all three resistance values.

Equation 51 indicates that the product LC is positive as required, while 52, since $k$ must be larger than unity indicates that if $\omega_0$ is smaller than $\omega_1$, the modulus of $n$ must be smaller than $\omega_0$. In practice, it is generally desirable to satisfy 23 and 24 and accordingly $\omega_0$ is indeed smaller than $\omega_1$ whereby the gain or the attenuation is limited to $\pi$ nepers or some 27 decibels. This is a wide range of values which can be regarded as sufficient in practice, so that there is no point in further considering here the case where $\omega_0$ is larger than $\omega_1$ although it can also be treated to determine the signs of the various resistances depending on the desired gain or attenuation. With $\omega_0$ smaller than $\omega_1$, 53, 54 and 55 indicate that R′ will benegative when the network provides a loss and positive when it provides a gain, while the signs of R and of $R_0$ will be the opposite of that of R′.

Thus, with the circuit of FIG. 3, not only can a complete discharge of the mid-shunt capacitance be secured but if a gain is desired up to about 27 decibels, only three negative resistances, i.e. $R_1$, $R_2$ and $R_0/2$ need be provided instead of the four required by the arrangement of FIG. 2.

Something remains to be said about the actual realization of the circuit when say a gain is desired although some of the elements in the original circuit normally introduce losses. Taking the circuit of FIG. 3 for instance, and assuming that the inductances and the gates such as $G_1$ and $G_2$ in FIG. 1, produce a pair of equivalent series dipoles each consisting of an inductance associated with two positive resistances and that a gain is actually desired, this means that additional elements will have to be associated with such series dipoles. The values of the elements L, R and R′ corresponding to the required overall equivalent dipoles (each including the original dipole with the two positive resistances) are determined from 51, 53 and 54.

To secure reflectionless gain or attenuation while keeping the reactive elements of the interconnecting network without energy at the end of the resonant transfer, a coil of inductance $L_1$ with a series resistance $R_1$ corresponding to losses will be associated with a parallel resistance and $R_2$ will be used to identify this parallel resistance in shunt with the parallel loss resistance of the coil, since a lossy coil is usually represented with a good approximation by a pure inductance associated with series and parallel resistances. Additionally, a resistance will be placed in series with this association and $R_3$ will be used to identify the series combination of this resistance with the series resistance representing the gate loss. If the whole dipole is now made equivalent to that comprising R′ across the series combination of R and L, with values given by 54, 53 and 51 respectively, this leads to the relations $$\frac{R_3}{R'}=\frac{\frac{R}{L}-\frac{R_1}{L_1}}{\frac{R+R'}{L}-\frac{R_1}{L_1}}=\frac{(n)\frac{3\omega_0^2-n^2}{\omega_0^2-n^2}-\frac{R_1}{L_1}}{\frac{n^2-\omega_0^2}{n}-\frac{R_1}{L_1}} \qquad (56)$$

$$R_2+R_3=R'=\left(\frac{1}{nC}\right)\frac{n^2-\omega_0^2}{n^2+\omega_0^2} \quad (57)$$

$$\frac{R_1+R_2}{L_1}=\frac{R+R'}{L}=\frac{n^2-\omega_0^2}{n} \quad (58)$$

Particularly considering the second expressions obtained above by using 51, 53 and 54, it is seen from 58 that for an overall gain, since $n$ is negative and its modulus smaller than $\omega_0$, $R_2$ will be positive. Accordingly, it is $R_3$ which should be negative. Considering 56, since R′ is positive for a gain and since the numerator of the second expression is then negative, its denominator should be positive and, using 23, this condition may be expressed as $$\frac{\omega_0 L_1}{R_1}>\frac{1}{-\frac{\pi}{nt_1}+\frac{nt_1}{\pi}} \quad (59)$$

Even when the gain of $-nt_1$ nepers is close to $\pi$, no difficulty will be encountered in selecting a coil whose quality factor $\omega_0 L_1/R_1$ satisfies the condition. The negative value of $R_3$ being determined from 56, the actual series negative resistance will have its modulus equal to this magnitude plus the positive resistance of the gate. Also, the value of $R_3$ being known, 57 gives $R_2$ equal to the actual resistance in shunt with the coil in parallel with the shunt resistance of the coil. Finally, 58 gives $L_1$.

If an overall loss is desired, $n$ is positive and 58 indicates that $R_2$ should now be negative while $R_3$ may be positive. Since R′ is now negative and since it is now the denominator of the second expression of 56 which is negative, its numerator should be positive and this leads to $$\frac{\omega_0 L_1}{R_1}>\frac{\left(\frac{\pi}{nt_1}\right)^2-1}{\frac{3\pi}{nt_1}-\frac{nt_1}{\pi}} \quad (60)$$

Again, even when the loss of $nt_1$ nepers is close to zero, the quality factor will readily meet the condition.

While the principles of the invention have been described above in connection with specific apparatus, it is to be clearly understood that this description is made only by way of example and not as a limitation on the scope of the invention.

I claim:

1. A time division multiplex communication system using resonant transfer networks for effectively completely transferring electrical energy between a plurality of terminal pairs over highway means, said terminal pairs each having means for storing electrical energy, said energy storing means comprising storage capacitance and series inductance, gate means for controllably connecting said terminal pairs to said highway means for definite time intervals, said capacitance being effectively interconnected by 4-terminal network means during the connected period, said 4-terminal network comprising a network means having one of said inductances in each of the series arms of said T, first and second resistor means connected in series with each of said inductances in the series arms of said T network, second and third resistor means bridging each of said series arms and said shunt arm comprising shunt capacitance means.

2. The resonant transfer network of claim 1 wherein said 4-terminal network is symmetrical.

3. The resonant transfer network of claim 1 wherein shunt resistance means is associated with the capacitance of said shunt branch.

4. The resonant transfer network of claim 3 wherein the values of said series inductances are L, the values of the associated series and parallel resistances are R and R′ respectively, the values of said shunt branch capacitance is $2C/k-1$ and the value of associated parallel resistance is $R_0/2$; where C is the storage capacitance and $k$ a dimensionless factor the relationships between L, R, R′, C and $R_0$ are given by:

$$LC_1=\frac{1}{\omega_0^2}\left(\frac{\omega_0^2-n^2}{\omega_0^2+n^2}\right)^2$$

$$k-1=\frac{(\omega_0^2-n^2)(\omega_1^2-\omega_0^2)}{(\omega_0^2+n^2)^2}$$

$$nCR=\frac{n^2(\omega_0^2-n^2)(3w_0^2-n^2)}{\omega_0^2(\omega_0^2+n^2)^2}$$

$$nCR'=\frac{n^2-\omega_0^2}{n^2+\omega_0^2}$$

$$nCR_0=\frac{(\omega_0^2-n^2)(\omega_1^2-\omega_0^2)}{(\omega_0^2+n^2)(\omega_1^2+n^2)}$$

where $\omega_0$ and $\omega_1$ are odd and even multiples of $\pi/t_1$ respectively, with $t_1$ defining said interconnecting time, while $-nt_1$ is the transmission gain of the network in nepers.

References Cited

UNITED STATES PATENTS 3,182,133 5/1965 Schlichte ............ 178—15

DAVID G. REDINBAUGH, *Primary Examiner.*

ROBERT L. GRIFFIN, *Examiner.*